United States Patent [19]

Suzuki et al.

[11] Patent Number: 5,189,647
[45] Date of Patent: Feb. 23, 1993

[54] INFORMATION PROCESSING SYSTEM HAVING POWER SAVING CONTROL OF THE PROCESSOR CLOCK

[75] Inventors: Naoshi Suzuki, Kanagawa; Shunya Uno, Machida, both of Japan

[73] Assignee: International Business Machines Corp., Armonk, N.Y.

[21] Appl. No.: 840,417

[22] Filed: Feb. 24, 1992

[30] Foreign Application Priority Data

Feb. 25, 1991 [JP] Japan .................. 3-050307

[51] Int. Cl.$^5$ .................. G06F 1/04; G04B 47/00
[52] U.S. Cl. .................. 368/10; 364/707; 364/DIG. 1
[58] Field of Search .............. 368/155, 156, 203-204; 364/200, 707, 900

[56] References Cited

U.S. PATENT DOCUMENTS

| | | | |
|---|---|---|---|
| 4,757,505 | 7/1988 | Marrington et al. | 364/200 |
| 4,758,945 | 7/1988 | Remedi | 364/200 |
| 4,780,843 | 10/1988 | Tietsen | 364/900 |
| 4,851,987 | 7/1989 | Day | 364/200 |

*Primary Examiner*—Vit W. Miska
*Attorney, Agent, or Firm*—Martin J. McKinley

[57] ABSTRACT

An information processing system operates under a multi-tasking operating system in which each task to be run is assigned a priority level. A Clock Switch (41) is positioned between the Clock Oscillator (50) and the Processor (10). A System Timer (70) establishes periodic intervals of time. At the beginning of each time interval, the System Timer, via an Interrupt Controller (60) and Transition Detector (42), turns ON (if its not already ON) the clock to the Processor by sending a Clock Start Signal to the Clock Switch. A Clock Control Program is assigned the lowest priority such that the Clock Control Program runs if and only if there are no other tasks running. When the Clock Control Program runs, it sends a code to a Register (43), which in turn sends a Clock Stop signal to the Clock Switch, thereby stopping the clock to the Processor. As described above, the System Timer will restart the clock again at the beginning of the next time interval. By stopping the clock to the Processor, the power to and the heat dissipated by the Processor are reduced. In an alternate embodiment, the frequency of the clock signal to the processor is reduced, rather than completely stopping the clock to the Processor.

2 Claims, 3 Drawing Sheets

INFORMATION PROCESSING SYSTEM HAVING POWER SAVING CONTROL OF THE PROCESSOR CLOCK

BACKGROUND OF THE INVENTION

Applicants claim the foreign priority benefits under 35 U.S.C. 119 of Japanese application 050307 filed on Feb. 25, 1991, which is wholly incorporated by reference herein.

The present invention pertains to information processing systems and, more particularly, to a power saving circuit that stops the processor clock signal or reduces its frequency during a processor idle state in order to decrease the power consumed by and the heat dissipated by the processor.

In a well known prior art processor, the contents of its internal registers are not lost if the clock signal to the processor is interrupted, and operations can be resumed from this halt state by simply restarting the clock signal to the processor. Such a processor may be called a "full-static processor." If the full-static processor uses CMOS logic, power consumption and the resulting heat generated can be greatly reduced if the clock signal to the processor is stopped while the processor is in an idle state. In addition, power consumption can also be reduced without stopping the clock signal to the processor if the frequency of the clock signal is decreased.

Japanese Published Unexamined Patent Application (PUPA) 62-169219 (U.S. Pat. No. 4,851,987) discloses an information processing system in which the clock signal to a processor is stopped in response to the execution of a program that determines whether the system is currently in a state where it waits for the completion of an operation of an input/output device or a key input from an operator. However, even though the system waits for the completion of an operation of an input/output device or a key input from an operator, the processor is not always in an idle state. This is particularly true in an information processing system that uses a multi-tasking operating system, wherein it is not unlikely that the processor is running a second task while waiting for the completion of an operation of an input/output device or a key input from an operator. Therefore, in the prior art device, there is a danger that the clock signal to the processor may be stopped while the processor is running a task.

SUMMARY OF THE INVENTION

An object of the present invention is to provide an information processing system that, during processor idle times, stops the clock signal to the processor or decreases the frequency of the clock signal in order to reduce the power consumed and the heat dissipated by the processor.

An information processing system is usually provided with a system timer for synchronizing the entire system, as well as a generator or oscillator for generating the clock signal to be supplied to the processor. Under a multi-tasking operating system, tasks are switched according to a priority given to each task for each time interval as determined by the system timer. In the present invention, a program (clock control program) controls the clock signal to the processor. The clock control program is given the lowest priority in the multi-tasking operating system so that the clock control program runs if and only if all other tasks are not running. Thus, the clock signal to the processor is either On or is switched ON at the beginning of each predetermined interval of time, as established by the system timer. If no other tasks are running at any particular time during the current time interval, the processor executes the low priority clock control program which, in turn, stops the clock to the processor. In the alternative, instead of stopping the clock to the processor, the frequency of the clock signal to the processor may simply be reduced.

DESCRIPTION OF THE PREFERRED EMBODIMENT

Figure 1:
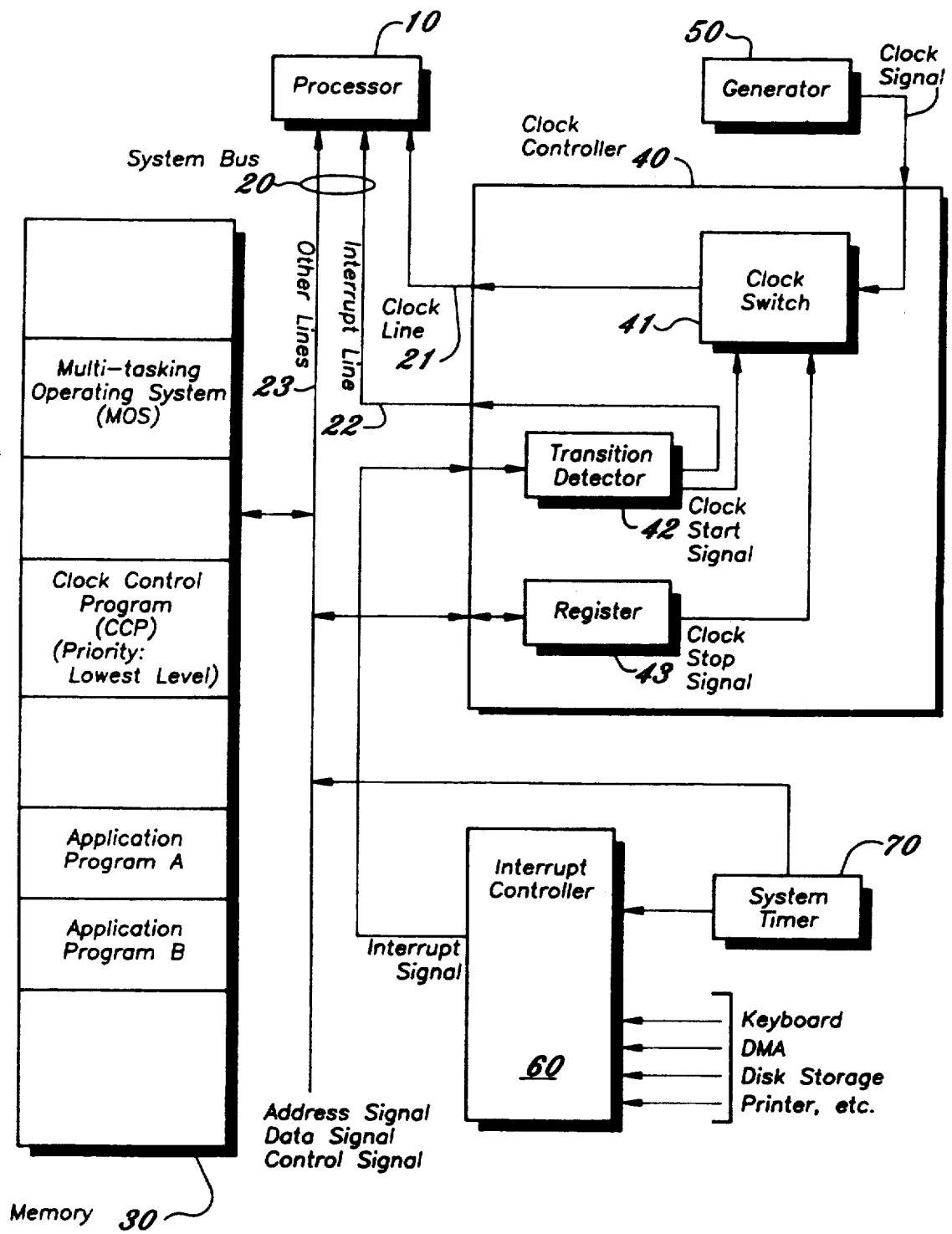
FIG. 1 is a block diagram of an information processing system constructed in accordance with the present invention.

FIG. 1 shows the overall construction of an embodiment of an information processing system according to the present invention. Referring to this figure, a Processor 10 is connected to a Clock Line 21, an Interrupt Line 22, and Other Lines 23. The Other Lines 23 include address, data and control signals (other than an interrupt signal) and are connected to a Memory 30 and a System Timer 70. The Other Lines 23 and the Interrupt Line 22 form a System Bus 20. The Memory 30 stores a Multi-Tasking Operating System MOS, a Clock Control Program CCP that runs in the lowest priority level under the Multi-Tasking Operating System, and Application Programs A and B.

The Clock Line 21 and the Interrupt Line 22 are connected to a Clock Controller 40. The Clock Controller 40 comprises a Clock (ON-OFF) Switch 41, a Transition Detector 42, and a Register 43. Generator 50 provides a continuous Clock Signal to the Clock Switch 41. The Clock Switch 41 inhibits the Clock Signal to the Processor 10 in response to a Clock Stop Signal from Register 43, and enables the Clock Signal to the Processor in response to a Clock Start Signal from the Transition Detector 42. The Transition Detector 42 is connected to an Interrupt Controller 60. Upon receiving an Interrupt Signal from the Interrupt Controller 60, the Transition Detector 42 passes the Interrupt Signal to the Processor 10 and sends a Clock Start Signal to the Clock Switch 41.

In addition to receiving interrupt signals from input/output devices, such as a keyboard, a disk storage, a printer, etc., the Interrupt Controller 60 also receives a signal from the System Timer 70. Upon receipt of an input interrupt signal, the Interrupt Controller 60 outputs an Interrupt Signal to the Transition Detector 42. Except when the interrupt signals from the input/output devices are received, the clock signal to the Processor 10 is started when the System Timer 70 indicates that a predetermined period of time has elapsed. Under the multi-tasking operating system, task execution is switched for each time interval indicated by the System Timer 70. Register 43 is used to receive and hold a result of the execution of the Clock Control Program.

The operation of the preferred embodiment of the invention will now be described by reference to FIGS. 1 and 2. Generally, in a multi-tasking operating system, a task scheduler, which is one of the component programs of the operating system, switches tasks ON or OFF. For each predetermined time interval, the task scheduler gives each task the execute right of the processor according to its priority at the completion of a currently running task. In addition, the execute right of the processor can be given to a task upon the occurrence of an event, such as an interrupt. The predetermined time intervals are established by the System Timer 70.

FIG. 1 illustrates the execution of multiple tasks, including the lowest priority Clock Control Program. These tasks are switched under control of the multitasking operating system and, in addition, the clock signal to the Processor 10 is switched On and OFF.

Figure 2:
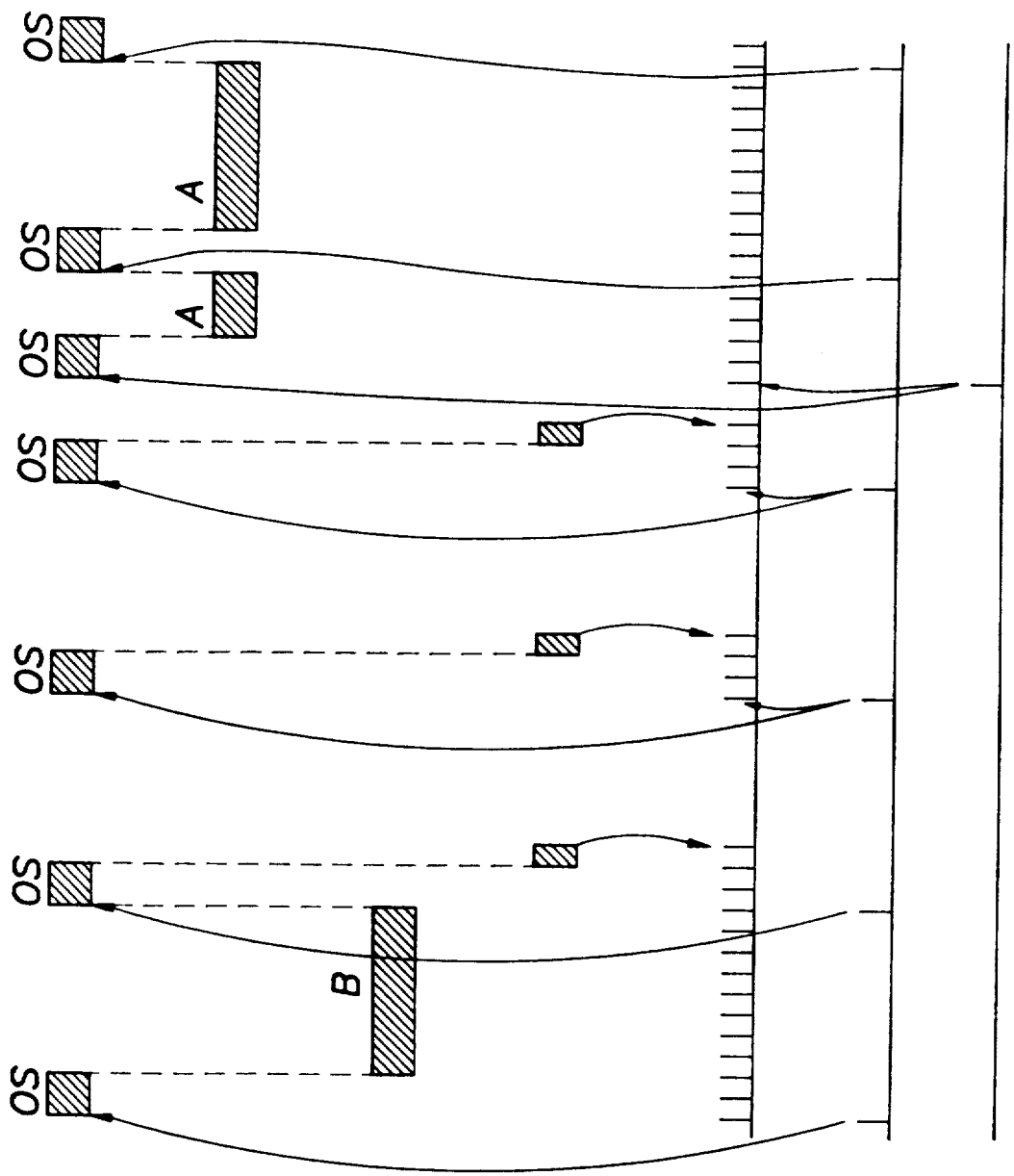
FIG. 2 is a timing diagram illustrating the operation of an information processing system constructed in accordance with the present invention.

The first situation illustrated in FIG. 2 is that in which the System Timer indicates the end of the current predetermined interval of time while Application Program B is running. In this situation, program execution temporarily changes from Application Program B to the Operating System OS. The Operating System then determines whether Application Program B has the execute right of the Processor 10 in the following predetermined interval of time and, in addition, also determines if any other programs require the execute right of the processor in the next time interval.

The second situation illustrated in FIG. 2 is that in which only the Clock Control Program requires the execute right of the Processor 10. When the Clock Control Program runs, a signal indicating that the clock signal to the Processor 10 may be stopped is sent to Register 43 through Other Lines 23. Since the function of the Clock Control Program is very simple (upon execution, it merely sends the appropriate code to Register 43, directing it to send the Clock Stop Signal to Clock Switch 41) its execution time is very short. Register 43 stores this code and provides a Clock Stop Signal to the Clock Switch 41 to stop the clock signal to the Processor 10.

The third situation illustrated in FIG. 2 is that in which the clock signal to the Processor 10 has been stopped and then the System Timer 70 issues a signal indicating the lapse of a predetermined period of time. In this situation, the Interrupt Controller 60 provides an interrupt signal to the Transition Detector 42, and then the Transition Detector provides a Clock Start Signal to the Clock Switch 41 to not only restart the clock signal to the Processor 10, but also to provide an interrupt signal to the Processor. Upon receiving the interrupt signal, the Processor 10 runs a timer interrupt handler and a dispatcher, which are component programs of the Operating System, and determines the programs to be run in the following predetermined interval of time.

In the fourth situation illustrated in FIG. 2, the only program to be initially run in the current predetermined period of time is the Clock Control Program. In this case, the Clock Control Program is executed and the clock signal to the Processor 10 is stopped. But after the clock has been stopped, the Interrupt Controller 60 issues an interrupt signal. In this situation, the clock signal to the Processor 10 is restarted and the Operating System determines the program to be run in the current predetermined interval of time. As illustrated in the figure, Application Program A then runs until the System Timer 70 signals the end of the current predetermined time interval. At the end of this predetermined time interval, the Operating System determines the programs to be run in the following time interval and, if that program is Application Program A, then Application Program A runs again until the System Timer 70 signals the end of the following time interval.

Figure 3:
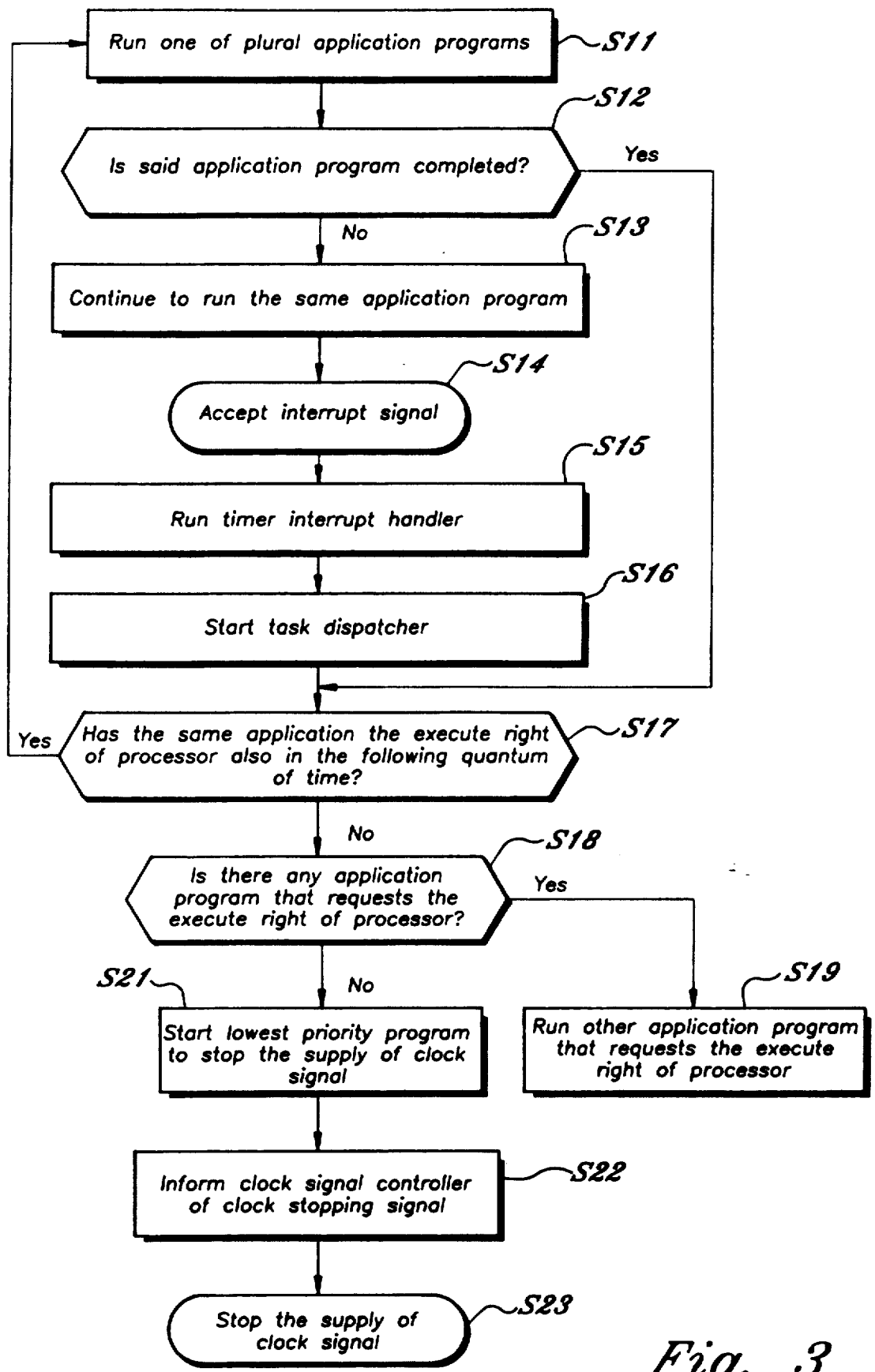
FIG. 3 is a flowchart of the process that controls the processor clock signals.

FIG. 3 is an illustration of the processing steps for stopping the clock signal to the Processor 10 under the operation of the Multi-tasking Operating System. In the figure, both the Interrupt Handler and the Task Dispatcher are component programs of a Task Scheduler, which is a component of the Operating System. The Interrupt Handler is a program that runs in response to an interrupt signal to stop and then restart an application that was running when the interrupt signal was received. The Task Dispatcher is a program that determines the next task to be run according to the priority given to each task. The Task Dispatcher also transfers the execute right of the processor to the next task to be executed.

In step S11 of FIG. 3, an application program, which has a priority greater than the lowest priority, is running. In the following step S12, a determination is made as to whether or not the application program has been completed. If the application program has been completed, the processing proceeds to step S16. If the application program has not been completed, the processing proceeds to step S13 wherein the same application program continues to run. If an interrupt signal is encountered while the application program is running, the interrupt signal is accepted in next step S14, and then the processing proceeds to step S15 wherein the Interrupt Handler is run. In next step S16, the task dispatcher is started. In the following step S17, the task dispatcher determines whether or not the running application program is authorized to run in the subsequent predetermined period of time. If the application program is authorized to run in the subsequent predetermined period of time, processing returns to step S11. If the application program is not authorized to run in the next time interval, processing proceeds to step S18.

In step 18, a determination is made as to whether or not there is another program that needs to be run. If another application needs to be run, processing proceeds to step S19 wherein that application program is executed. Otherwise, the processing proceeds to a step S21 wherein the Clock Control Program, which has the lowest priority, is started. In a subsequent step S22, the Clock Control Program sends to Register 43 a code to stop the clock signal to the Processor 10. And in next step 23, Register 43 sends a Clock Stop Signal to Clock Switch 41, thereby stopping the clock to the Processor.

Since the Clock Control Program only runs if there is no other task to be executed, the clock signal to the Processor 10 can not be stopped while some task is running in the background. Furthermore, by stopping the clock signal to the Processor when the Processor is idle, and restarting the clock at the beginning of the next time interval, as determined by the System Timer, power consumption and heat dissipation are reduced.

In a variation of the above embodiment of the invention, instead of simply stopping the clock to the processor, the frequency of the processor clock signal can be decreased to reduce power consumption and heat dissipation. Also, the Clock Controller 40 may be connected to another processor, besides Processor 10, and added to another program.

We claim as our invention:

1. An information processing system, comprising in combination:

a processor;

a bus coupled to said processor;

a clock generator for generating a clock signal;

a clock switch coupled between said clock generator and said processor, said clock switch having ON and OFF states;

register means, coupled between said bus and said clock switch, for receiving a stop code from said bus and for sending a stop signal to said clock switch to turn said clock switch OFF; and system timer means, coupled to said clock switch, for periodically sending start signals to said clock switch to turn said clock switch ON, such that said clock signal is coupled to said processor.

2. The information processing system of claim 1, further comprising:

memory means for storing programs, said memory means being coupled to said bus, each of the programs stored in said memory means being assigned a priority level; and a clock control program stored in said memory, said clock control program sending said stop code to said register means upon execution of said clock control program, said clock control program being assigned the lowest priority level, such that said clock control program runs only after all other programs requiring servicing have been executed.

* * * * *